United States Patent
Lohr et al.

(10) Patent No.: US 7,286,768 B2
(45) Date of Patent: Oct. 23, 2007

(54) DEVICE FOR OPTICAL SIGNAL TRANSMISSION

(75) Inventors: Georg Lohr, Eichenau (DE); Markus Stark, Waizendorf (DE); Hans Poisel, Leinburg (DE)

(73) Assignee: Schleifring und Apparatebau GmbH (DE)

( * ) Notice: Subject to any disclaimer, the term of this patent is extended or adjusted under 35 U.S.C. 154(b) by 487 days.

(21) Appl. No.: 10/373,545

(22) Filed: Feb. 25, 2003

(65) Prior Publication Data

US 2003/0156843 A1  Aug. 21, 2003

Related U.S. Application Data

(63) Continuation-in-part of application No. 09/068,932, filed on Sep. 2, 1998, now Pat. No. 6,650,843.

(51) Int. Cl.
*H04B 10/12* (2006.01)
*H04B 10/00* (2006.01)

(52) U.S. Cl. ............... 398/141; 398/151; 398/153; 398/165

(58) Field of Classification Search ........... 398/140, 398/141, 151, 153, 156, 165; 250/200, 216, 250/227.11; 340/870.28, 870.29
See application file for complete search history.

(56) References Cited

U.S. PATENT DOCUMENTS 4,646,086 A   2/1987   Helzel ............... 340/870.29
6,104,849 A * 8/2000   Lewis et al. ............ 385/26

* cited by examiner

*Primary Examiner*—M. R. Sedighian
(74) *Attorney, Agent, or Firm*—St. Onge Steward Johnston & Reens LLC

(57) ABSTRACT

An optical transfer device for transferring optical signals from a moveable part to a stationary part through an optical transfer medium in order to minimize distortions of the optical signal and increase the effective bandwidth of the signal transit path by minimizing and/or maintaining equal alternate optical signal transit paths from the transmitter to the receiver.

16 Claims, 9 Drawing Sheets

DEVICE FOR OPTICAL SIGNAL TRANSMISSION

PRIORITY DOCUMENT

The present application is a continuation-in-part of U.S. patent application Ser. No. 09/068,932, filed Sep. 2, 1998, now U.S. Pat. No. 6,650,843.

FIELD OF THE INVENTION

A device for transmitting optical signals from a movable part to a stationary part that increases bandwidth and decreases interference.

BACKGROUND OF THE INVENTION

The invention relates to devices for optical signal transmissions between a transmitter unit and a mobile receiving unit, which are optically coupled to each other via an optical transfer medium.

Optical systems are frequently employed to transmit data and signals. Such systems are fundamentally composed of a transmitter unit and a receiver unit, which are interconnected via an optical transfer medium. When the optical transfer medium is free space or air, an arrangement similar to a light barrier is achieved.

However, optical fibers, such as glass or synthetic fibers, are more frequently used to guide the light. In both case, the length of the optical path between the transmitter unit and the receiving unit is generally constant. As a result, the amplitude of the signal received in the receiver unit is not subject to significant variations with respect to time. This facilitates a uniform transmission quality.

In the case of transmission paths that have a variable optical path length between the transmitter unit and the receiving unit, the signal level at the receiver may vary due to attenuation along the optical path, which in turn may degrade transmission quality. In advanced digital transmission systems, in particular, this may result in an undesirable increase of the bit error rate.

The transit time of optical signals through the optical transfer medium may vary depending upon the distance between the transmitter and the receiver, varying from a range of almost zero when the transmitter is located in the immediate proximity of the receiver, up to a maximum value occurring when the transmitter unit is located at the farthest point along the optical medium from the receiver.

When the transmitter moves along the length of the medium, starting from the receiver up to the end of the optical medium, the transit time of the optical signal will increase as the transmitter moves away from the receiver. However, in rotary systems, the transmitter initially begins transmission at a starting point that is located at the receiver and continues around the circumference of the optical medium, thereby increasing the optical path length. Once the transmitter reaches the end of the optical transfer medium, the longest optical path length, the transmitter will then immediately transition from the end of the optical medium to the initial starting point to begin the process again. At the end of the optical transfer medium, there is a relatively long transit time for the optical signal to reach the receiver due to the distance traveled by the optical signal. However, upon transition to the starting point, the transit time is immediately reduced to almost zero.

This abrupt difference in transit time, which may occur during the transition, may give rise to a discontinuity in phase, restricting the bandwidth that can be transmitted, and may result in transmission errors.

Particularly, when optical signals are transmitted via an optical transfer medium shaped in the form of a closed curve, an overlapping at the beginning and the end of the optical medium is unavoidable unless a gap in transmission can be accepted in this position. That is, two signals are superimposed in the receiver, at the beginning and simultaneously at the end of the medium. The first signal is transmitted to the receiver without traveling along the optical path, and therefore reaches the receiver almost immediately. The second signal passes over the entire optical path length, and thus arrives at the receiver with a substantial delay. Both signals are now superimposed and produce an incorrect cumulative signal. As a result, the transmitted signal is degraded. Specifically, with high frequencies where the signal transit time corresponds to one half of the period, the signal is extinguished, such that a sensible data transmission is no longer possible.

What is desired then, is an optical transmission system that provides for transmission of optical signals from a transmitter to a receiver along a rotatable optical coupling where the optical signal quality is not degraded.

It is further desired to provide an optical transmission system having a signal transmission quality independent of the relative movements between the transmitter and the receiver.

It is also desired to provide an optical transmission system in which no signal overlapping occurs at the receiver to interfere with data transmission.

It is further desired to provide an optical transmission system that is small in size, is cost effective, and may be utilized for wide-band signal transmission.

SUMMARY OF THE INVENTION

These and other objects are achieved by providing a system in which various optical signals arrive at the receiver concurrently. Effective wide-band signal transmission may be achieved when optical signals are prevented from arriving at the receiver along several optical transmission paths of varying length, thereby creating differing transit times. This can be accomplished, for instance, if only one signal reaches the receiver. This may be the case, for instance, on a linear path. Independence may equally be achieved when several signals arrive at the receiver all having exactly the same optical transit times.

In one embodiment of the present invention the optical signals propagate through the optical transfer medium such that they arrive concurrently at the receiver and can thus be combined to form a single signal. Alternatively, in another embodiment of the present invention the transfer medium is designed such that signal overlapping is avoided.

Accordingly, the optical transfer medium is severed at one location and is closed in such a manner so as to minimize reflections. This separating point is located at that site of the curve from where the signal transit times in all directions of propagation to the receiver are equal. Hence, the light arrives at the receiver along both paths when the transmitter is positioned above the separating point. Here, the signal transit times are precisely equal and signal distortion will not occur. At all other transmitter positions the light progresses along one path to the receiver and along the other path to the separating point where it is absorbed. Hence there is only one light path from the transmitter to the receiver. This system ensures signal transmission over a substantially larger bandwidth.

The transmitter and the receiver may be movable relative to each other. For instance, the movement may here be circular, linear or along any other optional curve. In the event of linear travel of parts, the term "path length of travel" denotes that length of the path along which the transmitter unit and the receiving unit may be moved relative to each other. In the event of circular movements, it denotes the corresponding part along the periphery of the circle. At maximum, however, it denotes the complete circumference of the circle. The same applies also to any other curve along which a movement may be carried out.

Pursuant to an object of the invention, in order to provide a simple low-cost implementation of the amplifiers in the receiving unit, the optical path length must be kept as short as possible. Of note, because the length of the optical transfer medium is minimized, the transmission bandwidth is also substantially wider. This is because the transmission bandwidth is inversely proportional to the length of the optical medium.

In one embodiment of the present invention, an optical signal transmission system is provided between a stationary transmitter and a mobile receiver that are optically coupled to each other through an optical transfer medium such that, the transmitter transmits optical signals via at least one transfer medium along at least two different optical paths to the receiver. Both optical signal paths are designed so that the cumulative optical path length remains approximately constant and therefore, independent of the travel. This may be achieved for instance, when an optical transfer medium of constant length is used that has both ends coupled to the receiver and facilitates the coupling-in of light from the transmitter unit at any location along the length. The receiver is designed so that it receives the signals along the optical paths and generates a cumulative signal by summation that is largely independent of the travel path between the transmitter unit and the receiving unit.

In another embodiment of the present invention, the receiver includes several optical receivers that convert the optical signals into electrical signals. At least one optical receiver is associated with each optical path. The electrical signals of the receivers are then totaled in an adjoining adder.

In another embodiment of the present invention, the receiver is provided with an optical adder that adds up the optical signals of the paths. After such a summation the cumulative optical signal may be converted into an electrical signal whenever this will be necessary.

In a further embodiment of the present invention, with rotational movement between the transmitter and the receiver, the optical transfer medium may comprise an optical fiber in a circular configuration, which is doped with a fluorescent dye, such that optical signals may be coupled into the fiber at any location along the optical signal path.

In still another embodiment of the present invention, the transfer medium is discontinuous at least at one location, from which the transit times of the optical signals in both directions of the transfer medium to the receiving unit are equal. The optical signals are converted into electrical signals by means of two optical converters at the receiver location. To this end, the optical transfer medium is interrupted at the receiver location and an optical converter is inserted in each of the branches. Transition of the optical signal from one branch into the other branch will be subjected to a strong attenuation.

The two signals of the optical converters are superimposed by means of a circuit, which may comprise an analog or digital adding circuit. In the positioning of the separating point in the optical transfer medium, it must be determined whether the links between the optical converters and the adding circuit present equal transit times or differing transit times so that equal cumulative optical signal transit times will be achieved.

In still another embodiment of the present invention, the optical medium may be designed so that a slight overlapping of the two branches of the optical transfer medium occurs at the separating point, or at both separating points if two of them are provided. This ensures reception of optical signals by the receiver at any point along the optical transit path. The overlapping site must be designed so that optical signals will not transition from one branch to the other.

In yet another embodiment of the present invention, the receiver comprises at least one optical receiver associated with an optical transfer medium having a length shorter than the path covered from the optical transmitter relative to the optical transfer medium. The transmitter includes at least two optical transmitters spaced from each other, along the direction of longitudinal travel, such that the light of at least one of the optical transmitters will be coupled into the optical transfer medium. An optical transfer medium is utilized that encompasses only a portion of the entire path length. Several optical transmitters are provided to facilitate optical transmission over the entire wavelength and are arranged such that the optical transfer medium will be continuously illuminated by at least one optical transmitter. This makes continuous signal transmission along the entire path length possible.

In another embodiment of the present invention, receivers are arranged approximately in the center of the segments of the optical transfer medium such that the transit times of the optical signals from both ends of the optical transfer medium are equal. In this way there is no superimposition of optical signals with different transit times. The optical transmitters are arranged such that as a transmitter leaves an optical medium, a second transmitter approaches this optical medium on the other side. This provision allows for continuous signal transmission.

In another embodiment of the present invention several optical receivers are connected to an optical transfer medium. Signals of the optical receivers are combined with each other so that higher signal reliability may be achieved through redundancy. Further, signals from several optical receivers may be added to achieve a higher cumulative signal level and reduced noise. Redundant transmission also ensures that if a transmitter, an optical medium or even a receiver fails, signal transmission may still occur along a different optical path.

In a further embodiment of the present invention, the transmitter may comprise a position sensor for determining the particular optical transmitter located above the optical transfer medium. This information is then signaled to the particular optical transmitter to activate the full transmitting power of the particular optical transmitter. Conversely, when a transmitter is not within the range of the optical transfer medium, the transmitter may deactivate so as not to waste power. A further advantage is realized by longer service life of the transmitters and reduction of Electro-Magnetic Interference (EMI) generated by the high-power transmitters.

In still another embodiment of the present invention, several independent optical receivers with separate optical transfer mediums are provided. At least as many optical transmitters are provided as there are optical signal channels. A selector is further provided that is controlled by a position sensor for communicating to the selector which one of the optical transmitters are instantaneously able to transmit signals via the optical medium and the associated receiver to a specified logic signal channel. Depending on the position of the transmitter and receivers the transmission path may vary.

In a further embodiment a device is provided for transmitting optical signals between a stationary unit and a movable unit. The device includes an optical transmitting unit that is movable along a direction of movement, and has an optical transmitter for transmitting optical signals. The device also includes an optical receiving unit that is stationary with respect to the optical transmitting unit, and has a receiver for receiving optical signals. The device further includes an optical transfer medium that is optically coupled to the receiver, for transmitting optical signals to the receiver. The optical transfer medium is severed into first and second branches of equal lengths such that the optical signal transit time for an optical signal along either of the branches from the point of severance to the receiver is equal.

In another embodiment of the present invention, a device for transmitting optical signals between a stationary unit and a movable unit is provided including a movable unit having an optical transmitting unit for transmitting an optical signal. The device also includes a stationary unit having an optical receiving unit for receiving the optical signal. The optical receiving unit has a plurality of receivers. In addition, the device includes a plurality of optical transfer mediums associated with the plurality of receivers, for conducting the optical signals to the plurality of receivers. The optical signals are transmitted to fewer than the plurality of receivers at any particular time.

The invention and its particular features and advantages will become more apparent from the following detailed description considered with reference to the accompanying drawings.

DETAILED DESCRIPTION OF THE DRAWINGS

Figure 1:
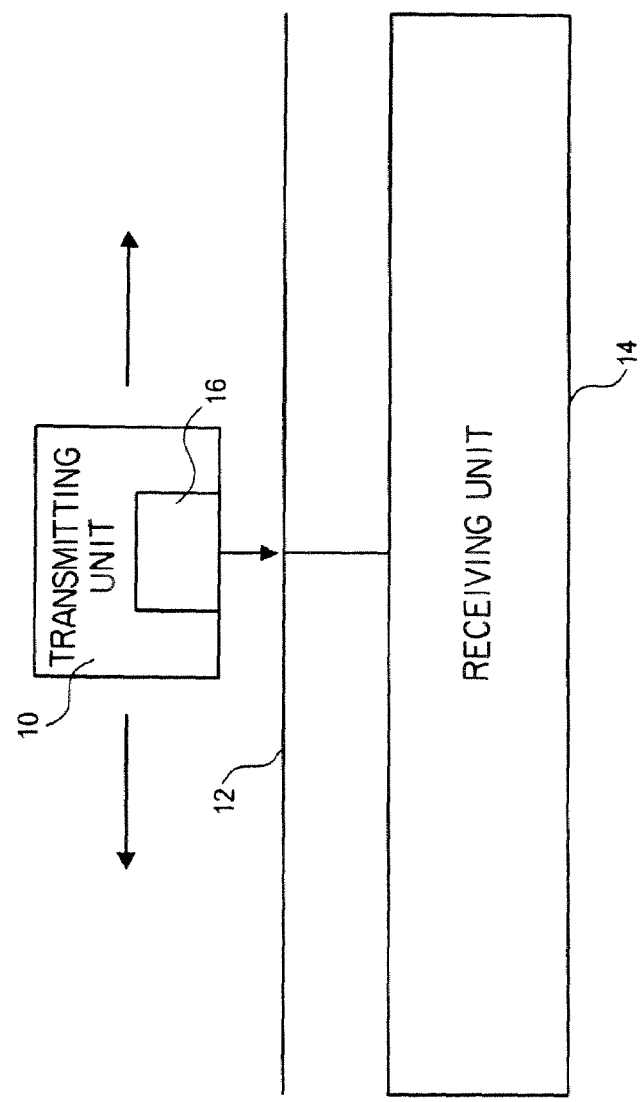
FIG. 1 is a block diagram illustrating a transmitting unit, a receiving unit and an optical medium that is severed according to an embodiment of the present invention.

FIG. 1 is an illustration of one advantageous embodiment of the invention, which generally comprises a transmitting unit 10, an optical medium 12, and a receiving unit 14. The transmitting unit 10 includes at least one transmitter 16, which relays optical information and/or energy via the optical medium 12 to the receiving unit 14. The optical medium 12 presents a constant length and is severed at one point so as to create two equal portions.

The transmitting unit 10 and the receiving unit 14 may be movable relative to each other. Generally one of the units, either the transmitting unit 10 or the receiving unit 14, is stationary and the other unit is movable. The movement may be either circular or linear, or along any other optional curve.

The transmitter 16 transmits optical signals to the receiving unit 14 along either one of the portions of the optical medium 12, except when the transmitter is located above the severance point, in which case, optical signals will travel along both portions of the optical medium 12 to the receiving unit 14. However, because the two portions of the optical medium 12 are equal in length, the two optical signals arrive at the receiving unit 14 at the same time.

The receiving unit 14 may include one or more receivers for receiving the optical signals. In addition, the optical medium 12 may include one or more severance points.

The severance points are formed in such a manner that reflection of optical signals along the optical medium 12 is minimized. Therefore, the severance points are designed to strongly attenuate optical signals that come into contact with them so that the optical signals are not transmitted into another portion of the optical medium 12, and are not reflected back into the same portion of the optical medium 12 thereby causing signal distortion at the receiving unit 14.

Figure 2:
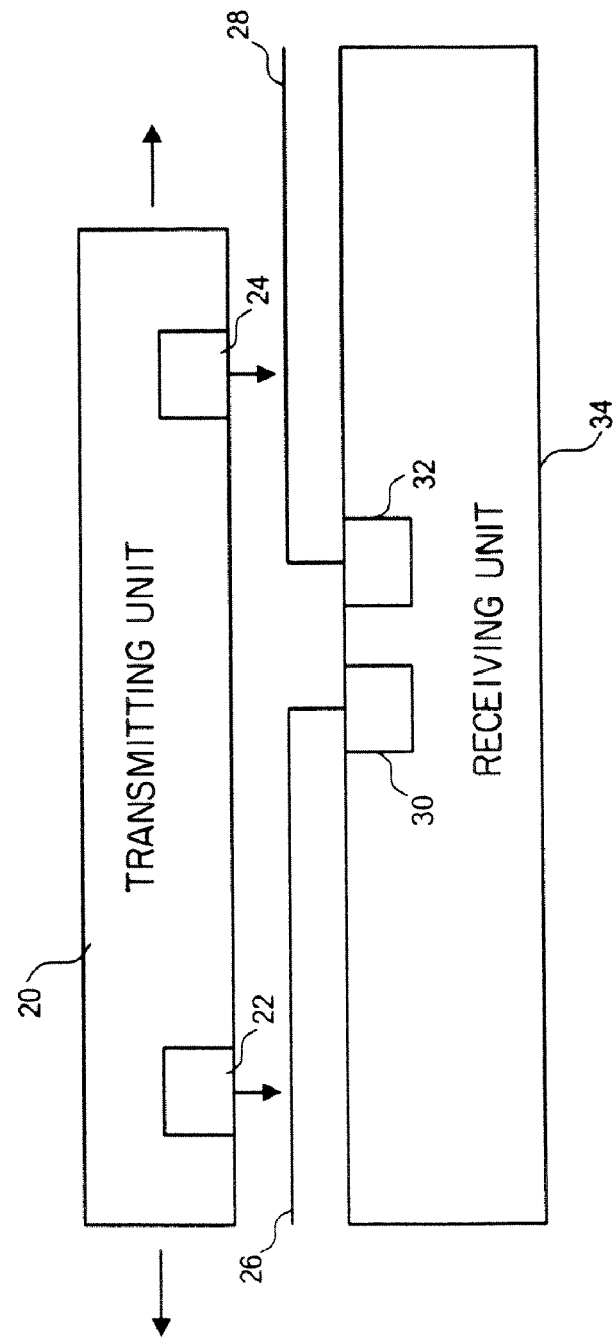
FIG. 2 is a block diagram illustrating a transmitting unit having multiple transmitters, a receiving unit having multiple receivers, and an optical medium that is severed.

FIG. 2 is an illustration of another embodiment of the present invention. A transmitting unit 20 is shown having two transmitters 22 and 24. In addition, an optical transfer medium is provided having two equal portions 26 and 28, corresponding to transmitters 22 and 24 respectively. A receiving unit 34 is further illustrated having two receivers 30 and 32 located therein. Receivers 30 and 32 are connected at one end of the optical transfer mediums 26 and 28 respectively, for receiving the optical signals and/or energy from transmitters 22 and 24. This facilitates the coupling-in of optical signals and/or energy from transmitters 22 and 24 at any location along the length of optical transfer mediums 26 and 28.

Both transmitters 22 and 24 transmit the same information simultaneously. Both optical signal paths are provided so that the cumulative optical path length, i.e. the sum of the optical path length from transmitter 22 to receiver 30 and from transmitter 24 to receiver 32, remains approximately constant and therefore, independent of the travel. The receiving unit 34 is designed so that it receives the optical signals and/or energy along optical transfer mediums 26 and 28 and generates a cumulative signal by summation that is largely independent of the travel path between the transmitting unit 20 and the receiving unit 34.

Figure 3:
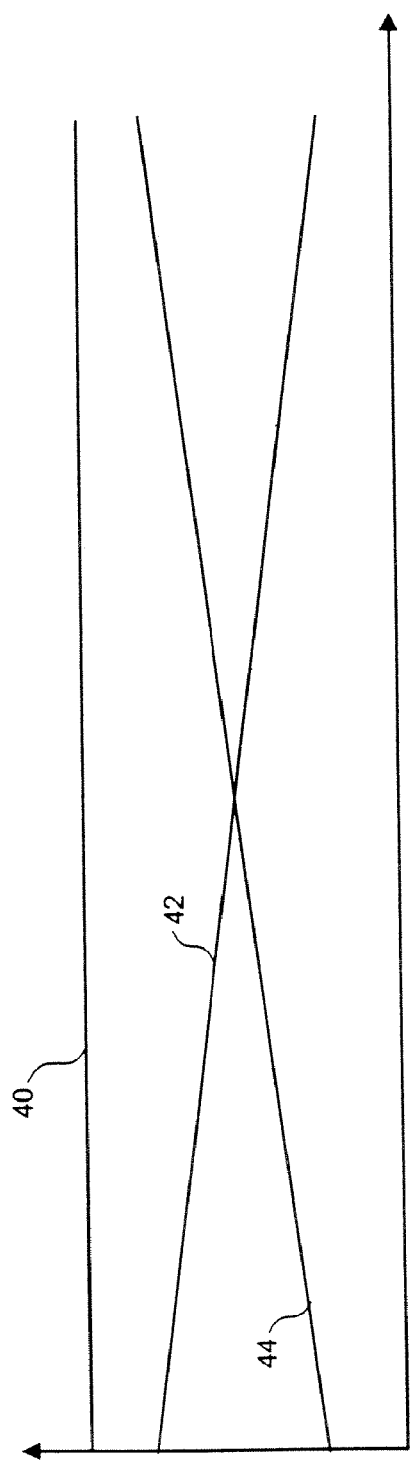
FIG. 3 is an illustration of a graph depicting the signals as received by the receivers in FIG. 2 and combined to form a cumulative signal.

FIG. 3 illustrates, the effects of the addition of two signals, corresponding to the system on the amplitude of the cumulative signal. The position of the transmitter relative to the receiver is plotted horizontally in the diagram. When the transmitter unit is in the left position, for example, the signal level 44 in the first receiver 30 is lower than the signal level 42 in the second receiver 32, due to the long optical path. When the transmitting unit 20 is moved, for instance; to the right, the signal level in the first receiver 30 rises, while the signal level in the second receiver 32 falls. In sum, the graph of the cumulative signal 40 is an approximation. This graph is approximately independent of the position.

Figure 4:
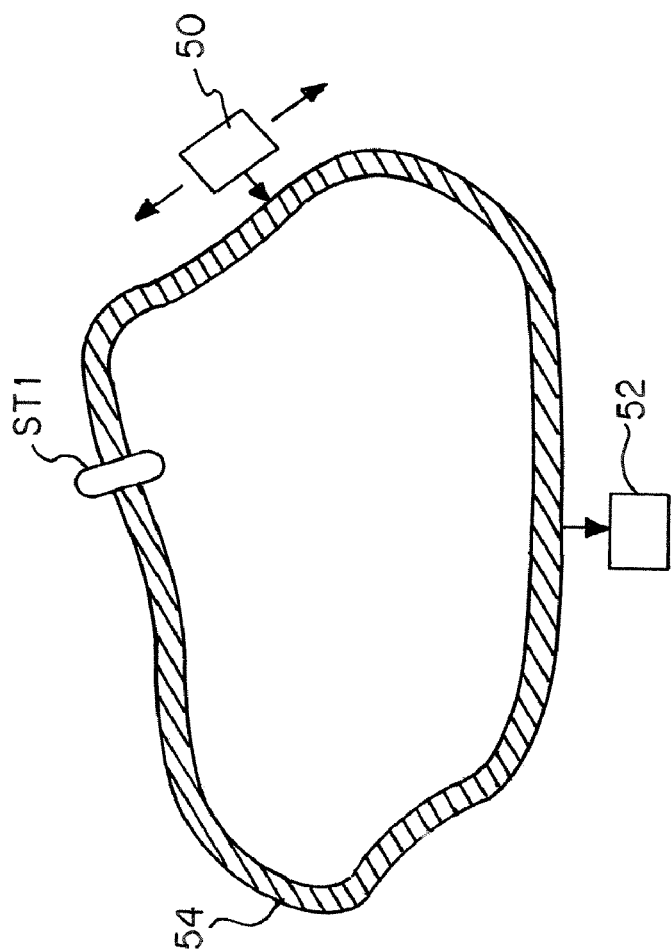
FIG. 4 illustrates a transmitting unit, a receiving unit and an optical medium that is severed according to the embodiment illustrated in FIG. 1.

FIG. 4 shows an embodiment of the invention consisting of a transmitting unit 50 and a receiving unit 52. The units are interconnected by an optical medium 54 of any kind desired, which is shaped to constitute a closed curve. The closed curve illustrated in FIG. 4 is shown as an irregular shape, however the curve may comprise any closed curve including for instance, but not limited to; a circle, an ellipse, or any closed shape. The transmitting unit 50 is adapted to be moved relative to the receiving unit 52 along this curve. In FIG. 4 the transmitting unit 50 is illustrated as the movable portion while the receiving unit 52 is depicted as the stationary portion. However, it is contemplated that receiving unit 52 may also comprise the movable portion while the transmitting unit 50 is stationary. Further, it is also contemplated that both the transmitting unit 50 and the receiving unit 52 may be moveable relative to each other. What is important here is the mutually relative movement. Likewise, the receiving unit 52 may move together with the optical medium 54 relative to the transmitting unit 50.

ST1 defines a point where the optical medium 54 is discontinuous or interrupted. The discontinuity or interruption of the optical medium 54 at point ST1 is designed such that optical signals propagating through the optical medium 54 that reach point ST1 will be largely absorbed and attenuated rather than being reflected back down the optical medium 54. Point ST1 is located in the optical medium such that the length of the severed optical medium is halved. That is, the length of the optical medium 54 from point ST1 to the receiving unit 52 is equal in both directions. This is desirable because it will facilitate having equal transit times for optical signals in both branches of the curve.

Figure 5:
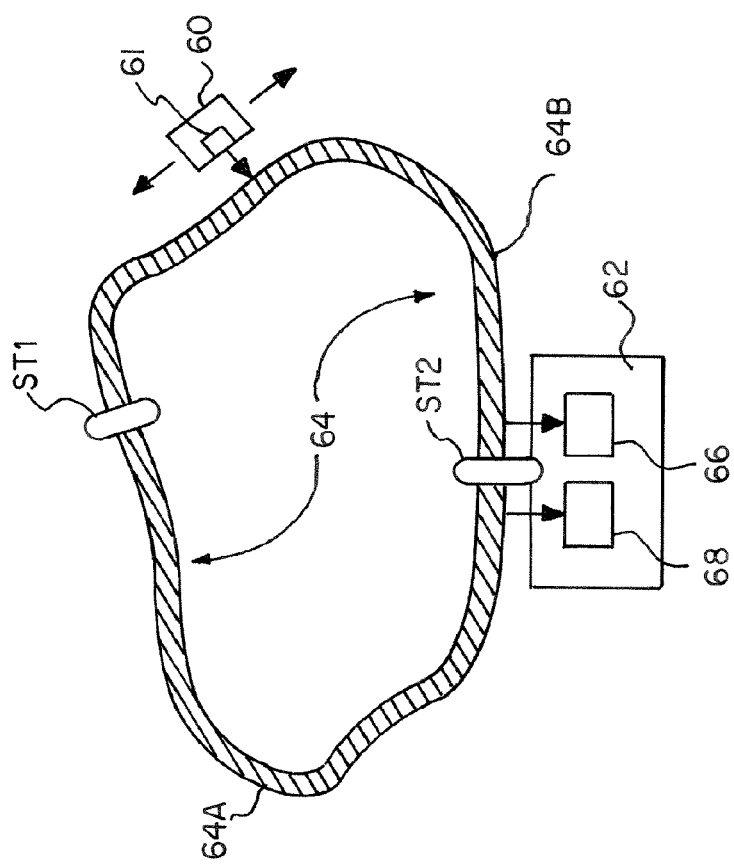
FIG. 5 illustrates a transmitting unit, receiving unit having two receivers, and an optical medium that is severed in two locations according to the embodiment illustrated in FIG. 1.

FIG. 5 is a further embodiment of the present invention. In this embodiment, a transmitting unit 60 is provided, having a transmitter 61 located therein, along with a receiving unit 62 for receiving the transmitted signal. In addition, optical medium 64 is provided and is discontinuous or interrupted at two points ST1 and ST2 forming two branches (64A and 64B) of the optical medium 64 of equal length. As described in FIG. 4, an optical signal interacting with ST1 or ST2 will be subjected to a strong attenuation to eliminate or minimize reflections back down the branch and/or eliminate transmission into the other branch of the optical medium 64.

Two optical converters 66 and 68 are provided in receiving unit 62. Optical converters 66 and 68 are each associated with branches (64A and 64B) of optical medium 64 respectively. The optical medium 64 is interrupted at point ST2 between optical converters 66 and 68 such that optical signals cannot be transmitted from one branch of the curve into the other one.

The received optical signals are converted into electrical signals by means of optical converters 66 and 68.

The two electrical signals generated by optical converters 66 and 68 are then superimposed by means of a circuit, which may comprise an analog or digital adding circuit. It is desired to form a cumulative optical signal with the analog or digital adding circuit, therefore, care must be taken in positioning the separating points ST1 and ST2 in the optical transfer medium such that, the optical medium 64 presents two branches of equal length so that the transit times of the optical signals are equal.

Figure 6:
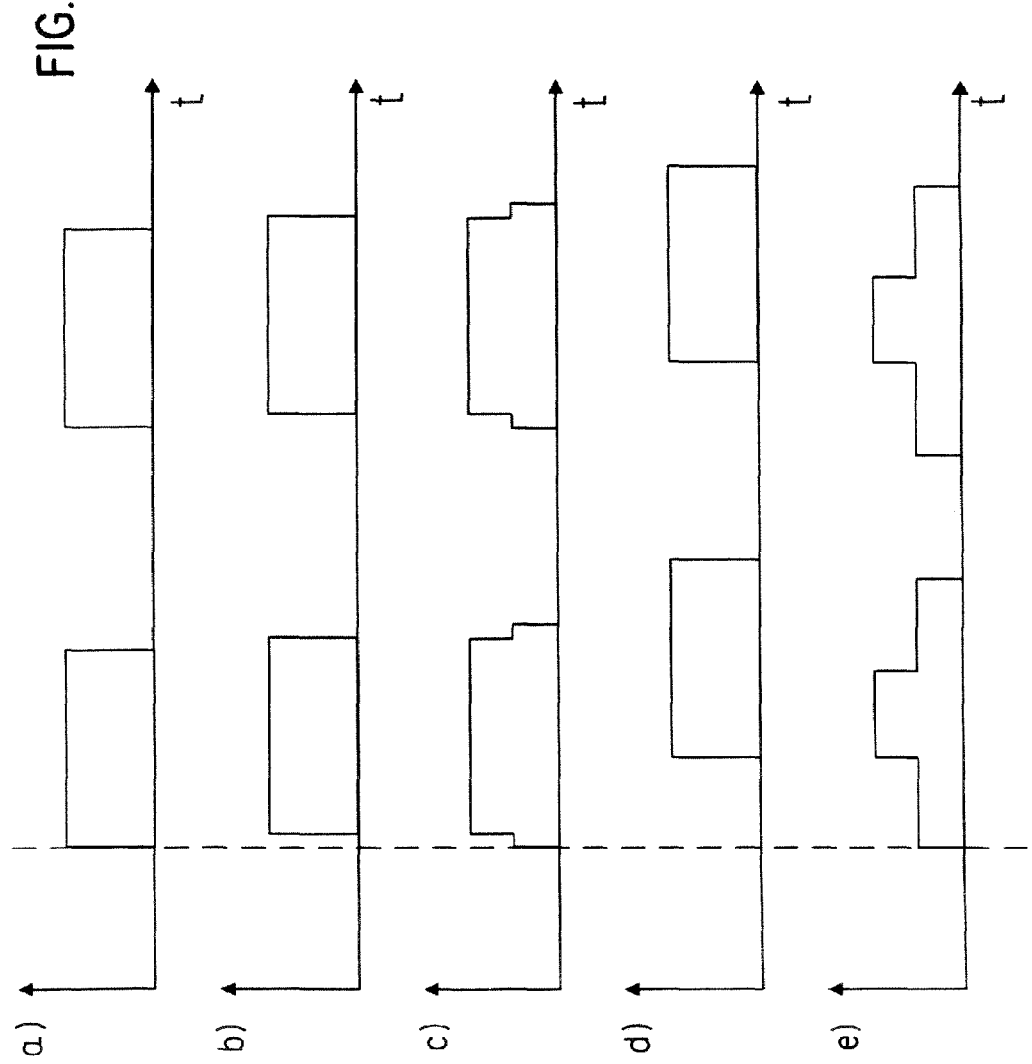
FIG. 6 is a signal/transit time diagram according to the embodiment illustrated in FIG. 5

FIG. 6 clearly shows the effects of the addition of signals with different transit times. Curve (a) corresponds to the original signal. The signal in curve (b) presents only slight delay relative to signal (a). The addition or superimposition of the two curves results in a signal corresponding to curve (c). This signal presents only slight distortions and is easy to evaluate in the receiving unit. In the event of a fairly strong delay of the second signal, e.g., the one represented by curve (d), an entirely different situation occurs. The result is plotted in curve (e). The development of the curve can no longer be unambiguously interpreted.

Evaluation becomes particularly complicated in an arrangement that corresponds to the prior art as the signal shape may vary over wide ranges (i.e., as a function of the position of the transmitter relative to the receiver). For instance, the signal shape may have any shape between curves (c) and (d) as a function of the position.

Figure 7:
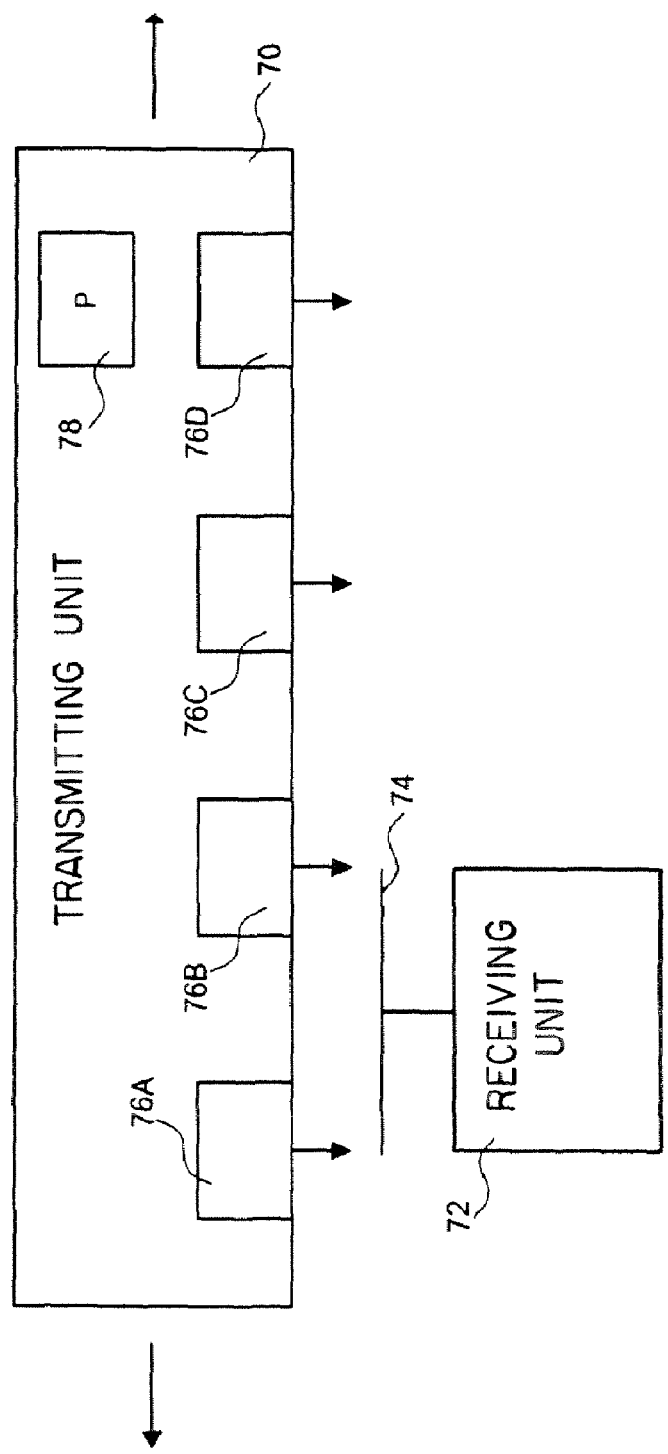
FIG. 7 is a block diagram illustrating a transmitting unit having multiple transmitters, a receiving unit, and an optical medium that is severed.

FIG. 7 is a view of a further embodiment of the invention. In this embodiment, transmitting unit 70 and receiving unit 72 are provided, with receiving unit 72 being connected to optical medium 74. Transmitting unit 70 includes several, optical transmitters (76A, 76B, 76C, 76D). Some of the optical transmitters are illustrated (76A, 76B, 76C, 76D), and are designed so that they are suitable for coupling optical data into optical medium 74. Although four optical transmitters (76A, 76B, 76C, 76D) are illustrated, any number may be utilized.

Optical transmitters (76A, 76B, 76C, 76D) are arranged such that at least one respective transmitter will couple an optical signal into optical medium 74 at any given time (t). The position sensor 78 determines the position (p) of the optical transmitters (76A, 76B, 76C, 76D). Once it is determined that a particular one of the optical transmitters (76A, 76B, 76C, 76D) is positioned above the optical medium 74 at a particular time t, that particular optical transmitter is activated to transmit an optical signal, while the remaining optical transmitters are off. The optical transmitters (76A, 76B, 76C, 76D) are therefore cycled on and off based upon their determined position with respect to the optical medium 74.

Figure 8:
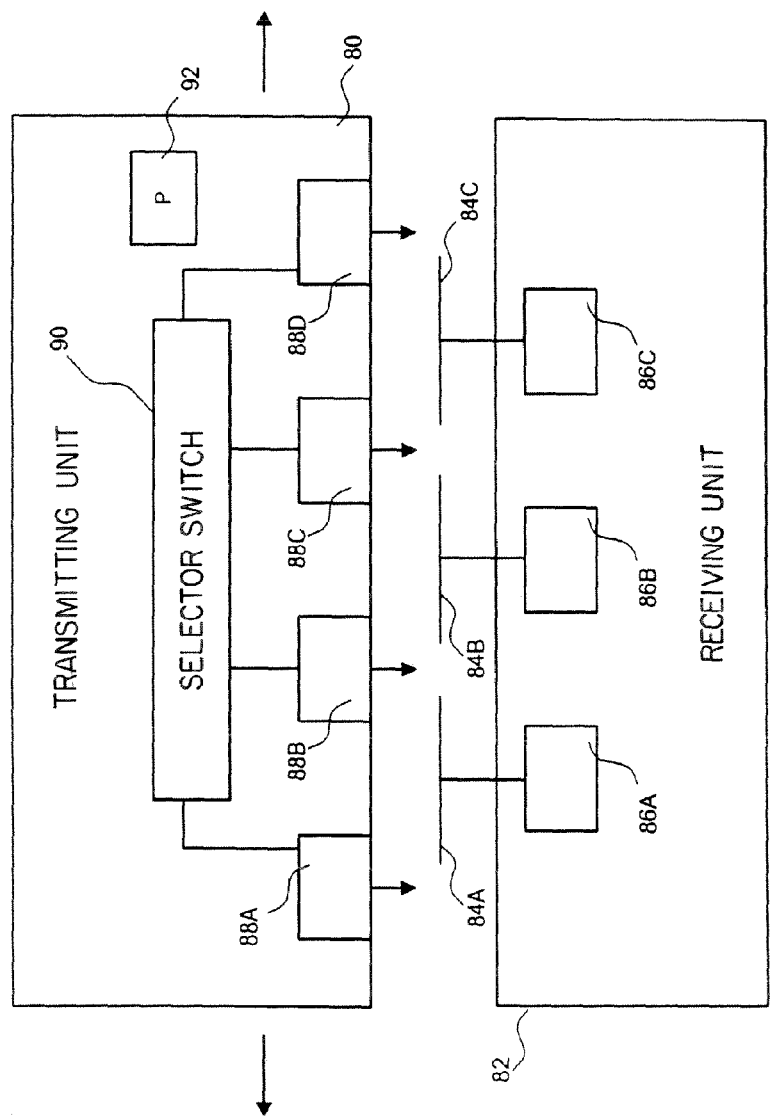
FIG. 8 is a block diagram illustrating a transmitting unit having multiple transmitters, and a receiving unit having multiple receivers each associated with an optical medium.

FIG. 8 depicts still another embodiment of the present invention including; transmitting unit 80, receiving unit 82 and an optical medium comprising three branches 84A, 84B and 84C. Receiving unit 82 is further provided with receivers 86A, 86B and 86C, corresponding to optical mediums (84A, 84B, 84C) respectively. Transmitting unit 80 includes transmitters 88A, 88B, 88C and 88D. In addition, transmitting unit 80 is provided with a selector switch 90 and a position sensor 92. As described in FIG. 7, the position sensor 92 determines the position of the transmitters (88A, 88B, 88C, 88D) with respect to the optical mediums (84A, 84B, 84C). The selector switch 90 then switches the transmitters (88A, 88B, 88C, 88D) on and off based on information from the position sensor 92, establishing a logic relationship between the transmitters (88A, 88B, 88C, 88D) and the receivers (86A, 86B, 86C).

In FIG. 8, four transmitters (88A, 88B, 88C, 88D) and three receivers (86A, 86B, 86C) are illustrated. However, any number and combination of transmitters and receivers may be utilized. In this particular illustration, one more transmitter is illustrated than receiver so that efficient transmission of signals from the respective transmitters (88A, 88B, 88C, 88D) to respective receivers (86A, 86B, 86C) may occur at time t. As described in FIG. 7, the position sensor 92 may cycle transmitters (88A, 88B, 88C, 88D) on and off based upon their position relative to optical mediums (84A, 84B, 84C) at time t.

Figure 9:
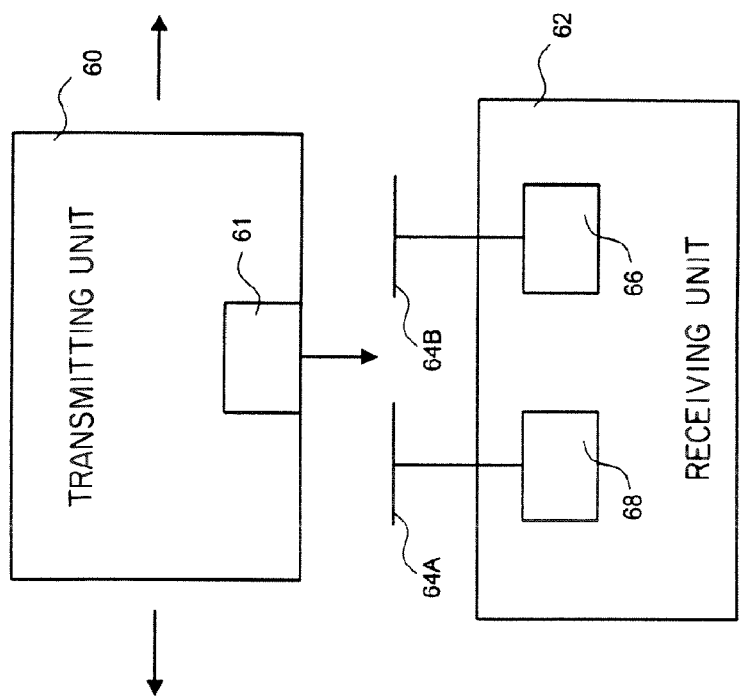
FIG. 9 is a block diagram according to FIG. 5 illustrating a transmitting unit, and a receiving unit having multiple receivers each associated with an optical medium.

FIG. 9 is a block diagram according to FIG. 5 of the present invention. Here transmitting unit 60 is provided including transmitter 61. In addition, receiving unit 62 is provided along with optical mediums 64A and 64B. The optical mediums (64A and 4B) are each associated with receivers 66 and 68 and are located in receiving unit 62 respectively. In this case, transmitter 61 transmits optical signals through a particular optical medium (64A and 64B) to a particular receiver (66, 68) at any particular time t.

In this block diagram, a single transmitter 61 is illustrated with two receivers (66 and 68) according to FIG. 5. However, more than one transmitter may be utilized, and any number of receivers may be utilized. However, in any event, the optical signal transmitted by transmitter 61 is received by less than all the receivers (66, 68), and the optical transmission path from the transmitter 61 to the respective receiver (66, 68) is shortened thereby reducing the signal transit time.

The relative movement of the transmitting units 10, 20, 60, 70 and 80 illustrated in FIGS. 1, 2, 7, 8 and 9 may comprise either linear or rotational movement (i.e. through a full 360 degrees or any fraction thereof).

Although the invention has been described with reference to a particular arrangement of parts, features and the like, these are not intended to exhaust all possible arrangements or features, and indeed many other modifications and variations will be ascertainable to those of skill in the art.

What is claimed is:

1. A device for transmitting optical signals between parts movable in relation to each other comprising:
    an optical transmitting unit having at least two transmitters for transmitting optical signals, said optical transmitting unit being movable along a path of movement;
    an optical receiving unit having a receiver for receiving the optical signals; and
    an optical transfer medium for optically coupling said optical transmitting unit to said optical receiving unit;
    wherein the length of said optical transfer medium is shorter than the path of movement along which said optical transmitting unit travels; and
    the at least two optical transmitters are spaced from each other along the path of movement of said transmitting unit such that optical signals from at least one of the optical transmitters is coupled into said optical transfer medium at any particular time.

2. The device according to claim 1, wherein said optical receiving unit is centrally disposed along a length of said optical transfer medium such that transit times of optical signals from a first end and a second end of said optical transfer medium to said optical receiving unit are equal.

3. The device according to claim 2, wherein said at least two optical transmitters are spaced from each other such that when one of said optical transmitters advances beyond the first end of said optical transfer medium owing to movement of said optical transmitting unit along the path of movement, the second optical transmitter approaches the second end of said optical transfer medium, hence continuing a transmission of optical signals.

4. The device according to claim 3, wherein said optical transmitting unit further comprises a position sensor for determining which one of said transmitters is in a position to be coupled with said optical transfer medium and for transmitting an activation signal to said one transmitter to activate a full transmitting power thereof.

5. The device according to claim 1, for transmitting optical signals from said transmitting unit to said receiving unit along a plurality of logical signal channels, said device further comprising:
    a plurality of optical transfer mediums associated with a plurality of receivers, each optical transfer medium being assigned to a particular logical signal channel;
    a position sensor, for determining which of one said optical transmitters is able to transmit optical signals to an optical receiver assigned to a particular logical signal channel via the optical transfer medium associated with said optical receiver, at any particular time; and
    a selector switch, controlled by said position sensor for switching any one of the plurality of transmitters to any one particular logical signal channel;
        wherein said position sensor communicates to the selector switch which of the plurality of transmitters is able to transmit optical signals to a particular logical channel at any particular time.

6. The device according to claim 1, wherein said optical transfer medium is selected from the group consisting of: a light-conducting fiber, a light-conducting fiber doped with a fluorescent dye, a shaped light-conducting body and a light-conducting liquid.

7. The device according to claim 1, wherein said optical transfer medium is formed in a linear configuration.

8. The device according to claim 7, where the path of movement is linear movement between said optical transmitting unit and said optical receiving unit, and said linear configuration is formed in parallel with the direction of the linear movement.

9. A device for transmitting optical signals between parts movable in relation to each other comprising:
    a transmitting unit, movable along a direction of movement, and having a plurality of transmitters for transmitting optical signals;
    a receiving unit, having a plurality of receivers for receiving optical signals;
    a plurality of optical transfer mediums associated with said plurality of receivers;
        wherein the plurality of transmitters are greater in number than the plurality of receivers such that not every transmitter is coupled to every receiver at any particular time.

10. The device according to claim 9 wherein said transmitting unit includes a position sensor for sensing the position of said plurality of transmitters in relation to said plurality of receivers such that any particular transmitter may transmit optical signals to any particular receiver at any particular time.

11. A device for transmitting optical signals between parts movable in relation to each other comprising:
    a movable unit, with an optical transmitting unit associated therewith for transmitting an optical signal;
    a stationary unit, with an optical receiving unit associated therewith for receiving the optical signal, the optical receiving unit having at least two receivers;
    an optical transfer medium associated with each of the at least two receivers, for conducting the optical signals to the at least two receivers respectively;
        wherein the transmitting unit is coupled to one of the at least two receivers at any particular time such that the optical signals are transmitted to fewer than all of the at least two receivers at any particular time.

12. The device according to claim 11 wherein the transmitting unit has at least two transmitters for transmitting optical signals and the receiving unit has at least three receivers for receiving the optical signals.

13. The device according to claim 12 wherein the total number of transmitters is fewer in number than the total number of receivers.

14. The device according to claim 13 wherein the transmitters are spaced and located in the optical transmitting unit along a direction of movement.

15. The device according to claim 14 wherein the direction of movement is linear.

16. The device according to claim 14 wherein the direction of movement is along a closed curve.

* * * * *